Dec. 10, 1968   E. H. BUCKNELL ET AL   3,415,280
CONTROL VALVE
Filed June 24, 1965   2 Sheets-Sheet 1
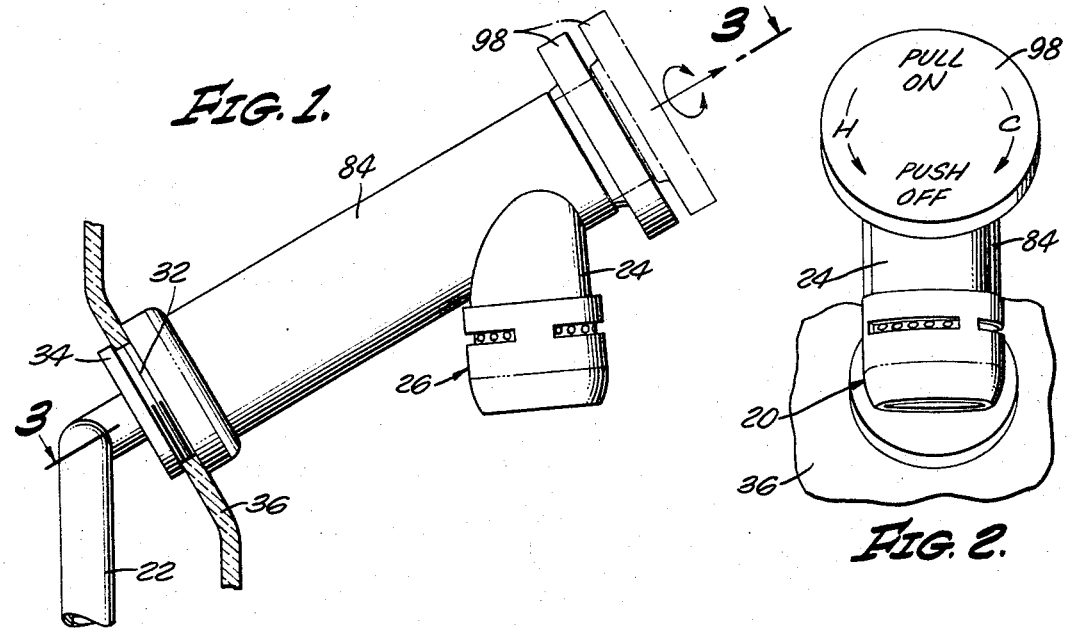
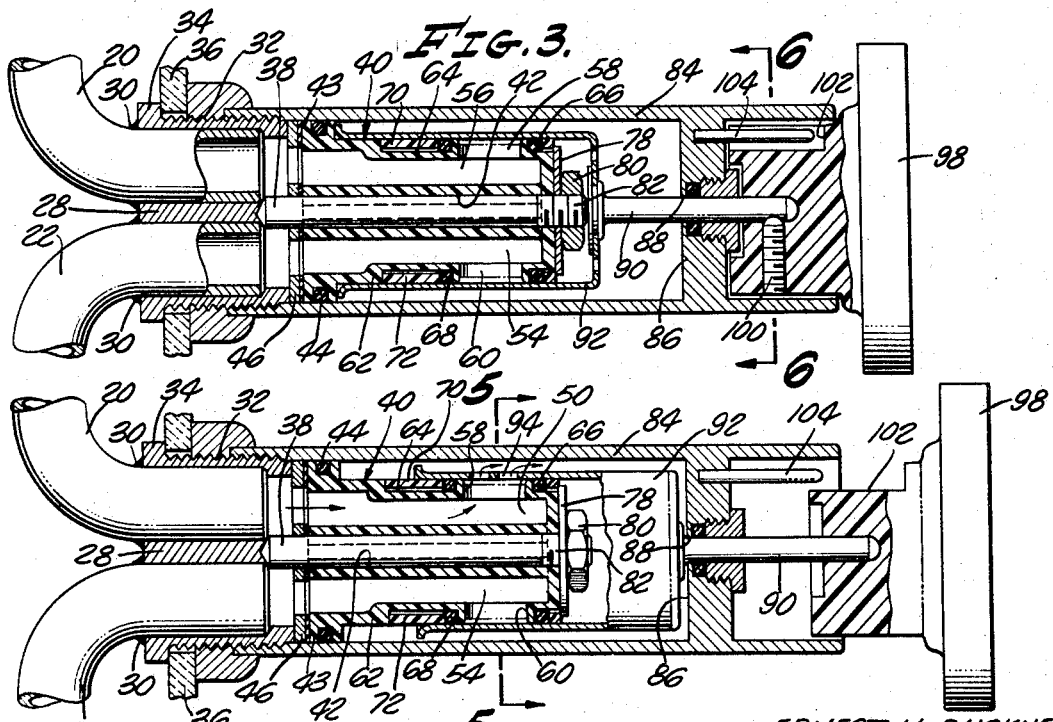
ERNEST H. BUCKNELL
IRVING A. WARD
INVENTORS.
BY Lyon & Lyon
ATTORNEYS Dec. 10, 1968  E. H. BUCKNELL ET AL  3,415,280
CONTROL VALVE
Filed June 24, 1965  2 Sheets-Sheet 2

ERNEST H. BUCKNELL
IRVING A. WARD
INVENTORS.

BY Lyon & Lyon
ATTORNEYS

United States Patent Office 3,415,280
Patented Dec. 10, 1968

3,415,280
CONTROL VALVE
Ernest H. Bucknell and Irving A. Ward, Los Angeles, Calif., assignors of ten percent to estate of Ralph E. Bletcher, deceased; five percent each to Frederick Robertson and Gary Robertson; ten percent each to Leanara Bucknell, Richard H. Bletcher, and Dan G. Liston; five percent to Dan G. Liston, as trustee for Daniel E. Liston, and Carol A. Liston, and James H. Liston; ten percent each to Hazel Brondum and Pearl Bletcher; five percent to Marcia Liston; and ten percent to Ernest H. Bucknell
Filed June 24, 1965, Ser. No. 466,657
5 Claims. (Cl. 137—625.17)

ABSTRACT OF THE DISCLOSURE

A control valve employing a hollow post and a movable control sleeve mounted over said post. Fluid is supplied to the post which has one or more discharge openings and which cooperate with one or more discharge ports through said sleeve. Resilient rings surround each discharge opening in the post, and a cover surrounds said rings for retaining the same in position.

---

This invention relates to an improved control valve.

It is an object of this invention to provide a control valve having the pressures therein balanced so that no force is exerted by water therein tending to vary the positioning of the valve.

Still a further object of this invention is to provide a control valve which is self-balancing in response to surges of water pressure.

A further object of this invention is to provide a valve which is easily and readily operated to control water flow therethrough.

Still a further object of this invention is to provide a valve wherein the parts are readily accessible for repair or replacement.

Other objects and advantages will be apparent from the following description.

In the drawings:

FIGURE 1 is a side elevation of a valve embodying this invention;

FIGURE 2 is an end view of the valve;

FIGURE 3 is a view taken along line 3—3 of FIGURE 1;

FIGURE 4 is a view similar to FIGURE 3 with the valve in the open position;

Figure 5:
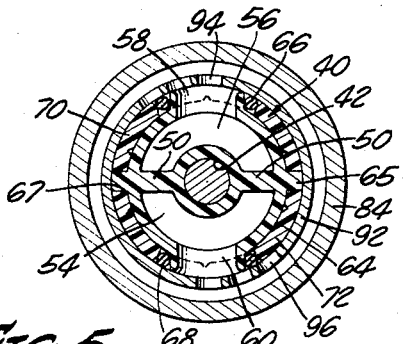
FIGURE 5 is a view taken along line 5—5 of FIGURE 4.
Figure 6:
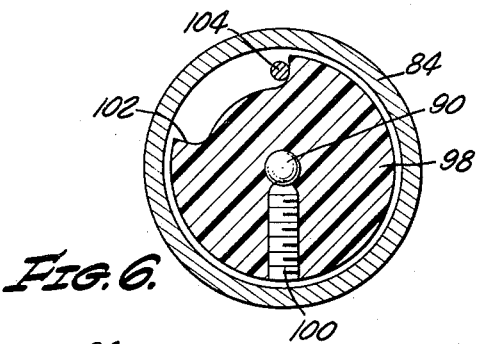
FIGURE 6 is a view taken along line 6—6 of FIGURE 3.
Figure 8:
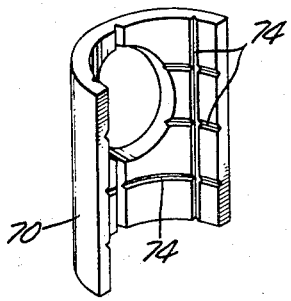
FIGURE 8 is a perspective of one of the covers.
Figure 7:
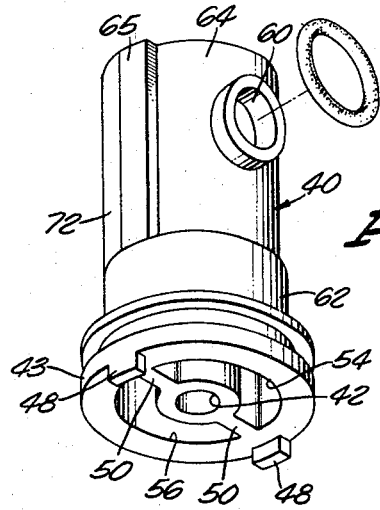
FIGURE 7 is a perspective of the post.

Hot water is supplied through tube 20 and cold water through tube 22 from suitable sources to be discharged through outlet 24 which in this embodiment has an aerator 26 affixed thereto.

Tubes 20 and 22 fit into suitable bores through base 28 and are soldered thereto as at 30. The base is externally threaded as at 32 and has a flange 34 which abuts the rear surface of plate 36. A pin 38 is secured to base 28 by soldering or otherwise.

Post 40 is preferably formed of Delrin or other suitable material and has an interior bore 42 through which pin 38 passes. At its extremity nearest base 28 the post has an enlarged head 43 having a peripheral groove within which O-ring 44 is seated. A ring 46 having a pair of peripheral slots is soldered to base 28. The post 40 carries a pair of protuberances 48 which fit into said slots to prevent rotation of said post. The remaining extremity of post 40 is closed and dividing walls 50 and 52 extend the length thereof forming two compartments 54 and 56 communicating with tubes 22 and 20, respectively, the extremity of pin 38 preventing communication between said compartments.

A discharge opening 58 and 60 is provided for each compartment normal to the direction of flow into same. Above the head on post 40 is a cylindrical segment 62 and above the cylindrical segment is a section 64 having a reduced diameter. A pair of opposed ribs 65 and 67 extend upwardly from the cylindrical segment having an outer diameter slightly less than that of the cylindrical segment.

Surrounding each discharge opening 58 and 60 is a flange upon which an O-ring 66 or 68 is mounted. A cover 70 and 72 fits around the reduced section 64 of the post 40 and abuts the ribs 65 and 67 and cylindrical segment 62. The inner surface of each cover has vent grooves 74 formed therein to relieve pressure and same are permitted limited flexing while supporting O-rings 66 and 68 on section 64 within a sleeve 92 which has an internal diameter closely approximately the outer diameter of the O-ring.

A washer 78 abuts the closed extremity of post 40 and nut 80 screws onto the threaded end 82 of pin 38 to maintain the parts assembled. An outer sleeve 84 screws onto base 32 and has a barrier 86 therein with a central bore 88 through which pin 90 passes. Pin 90 carries operating sleeve 92 which snugly fits over covers 70 and 72 and cylindrical segments 62 of post 40 and abuts the enlarged head 43. Sleeve 92 has formed therein two sets of holes 94 and 96 (see FIGURE 5). When the sleeve is in the position illustrated in FIGURE 3, the holes are out of alignment with discharge openings 58 and 60 and O-rings 66 and 68 prevent flow. When the operating sleeve 92 is pulled to the position shown in FIGURE 4, holes 94 register with discharge opening 58, permitting flow of hot water into sleeve 84 and hence through discharge 24. By varying the size, number and position of the holes in set 94, the volume of flow is controlled.

The sleeve 92 is rotated to register the set of holes 96 with discharge opening 60. The sets of holes are positioned so that either hot or cold water may be directed to outlet 24 or a mixture thereof.

To control the position of operating sleeve 92, a knob 98 is provided having a bore therein receiving the extremity of pin 90 and is secured by set screw 100. The knob has a slot 102 therein which receives pin 104 secured in barrier 86 and limits rotation of the knob and hence control sleeve 92.

Figure 9:
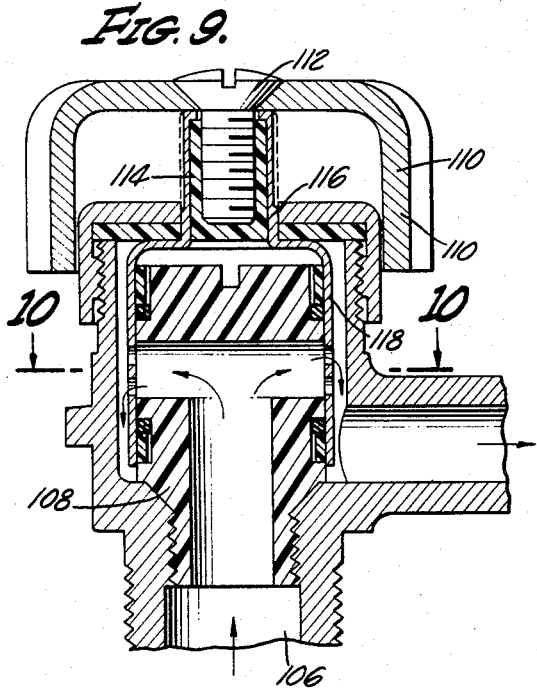
FIGURE 9 is a section of a modified form of the valve.
Figure 10:
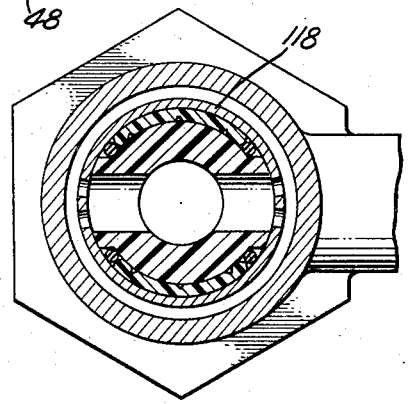
FIGURE 10 is a view taken along line 10—10 of FIGURE 9.

In FIGURES 9 and 10 a modification is illustrated wherein water is supplied from a single source through tube 106 to post 108. The valve mechanism is essentially the same as in the principal embodiment. The control mechanism comprises a knob 110 held by screw 112 on post 114 which in turn is secured in hollow stem 116 on control sleeve 118.

While what hereinafter has been described as the preferred embodiment of this invention, it is readily apparent that alterations and modifications may be resorted to without departing from the scope of this invention and such alterations and modifications are intended to be included within the scope of the appended claims.

We claim:
1. A control valve comprising a hollow post having a closed end and at least one discharge opening approxi- mately normal to the longitudinal axis of said post, means for supplying fluid to said post along the longitudinal axis thereof, an O-ring surrounding each discharge opening externally of said post, a cover surrounding said O-ring and supporting same, said cover having a face adjacent said post and vent grooves in said face, a control sleeve surrounding said cover and against which said O-ring bears forming a closure for said discharge opening, means forming a discharge port through said control sleeve, and means for moving said control sleeve to register said discharge port with said discharge opening.

2. A control valve comprising a hollow post having a closed end and a pair of opposed discharge openings approximately normal to the longitudinal axis of said post, an O-ring surrounding each discharge opening externally of said post, a pair of covers each having a face adjacent said post, said covers surrounding said post and each having an opening therethrough surrounding and supporting one of said O-rings, a control sleeve surrounding said covers and against which said O-rings bear forming a closure for said discharge opening, means forming discharge ports through said control sleeve, means for moving said control sleeve to register said discharge ports with said discharge opening, and vent grooves in the face of said covers.

3. A control valve comprising a hollow post having a closed end and a pair of opposed discharge openings approximately normal to the longitudinal axis of said post, an O-ring surrounding each discharge opening externally of said post, a pair of covers each having a face adjacent said post, said covers surrounding said post and each having an opening therethrough surrounding and supporting one of said O-rings, a control sleeve surrounding said covers and against which said O-ring bear forming a closure for said discharge opening, means forming discharge ports through said control sleeve, means for moving said control sleeve to register said discharge ports with said discharge opening, a pair of circular flanges on said post upon which said O-rings are mounted, and vent grooves in the face of said covers.

4. A control valve comprising a hollow post having a closed end and a pair of opposed discharge openings approximately normal to the longitudinal axis of said post, an O-ring surrounding each discharge opening externally of said post, a pair of covers each having a face adjacent said post, said covers surrounding said post and each having an opening therethrough surrounding and supporting one of said O-rings, a control sleeve surrounding said covers and against which said O-rings bear forming a closure for said discharge opening, means forming discharge ports through said control sleeve, means for moving said control sleeve to register said discharge ports with said discharge opening, vent grooves in the face of said covers, and barrier means in said post isolating one discharge opening from the other.

5. A control valve comprising a hollow post having a closed end and a pair of opposed discharge openings approximately normal to the longitudinal axis of said post, an O-ring surrounding each discharge opening externally of said post, a pair of covers each having a face adjacent said post, said covers surrounding said post and each having an opening therethrough surrounding and supporting one of said O-rings, a control sleeve surrounding said covers and against which said O-ring bear forming a closure for said discharge opening, means forming discharge ports through said control sleeve, means for moving said control sleeve to register said discharge ports with discharge opening, a pair of circular flanges on said post upon which said O-rings are mounted, vent grooves in the face of said covers, and barrier means in said post isolating one discharge opening from the other.

References Cited

UNITED STATES PATENTS 2,854,999  10/1958  Moen _____ 137—625.17
3,033,226  5/1962  Allen _____ 251—317 X M. CARY NELSON, *Primary Examiner.*

MICHAEL O. STURM, *Assistant Examiner.*